(No Model.) 3 Sheets—Sheet 1.

E. R. WHITNEY.
APPARATUS FOR TILLING GROUND.

No. 385,984. Patented July 10, 1888.

Witnesses. Inventor, (No Model.) 3 Sheets—Sheet 2.

E. R. WHITNEY.
APPARATUS FOR TILLING GROUND.

No. 385,984. Patented July 10, 1888.

Witnesses

Inventor.

(No Model.) 3 Sheets—Sheet 3.
E. R. WHITNEY.
APPARATUS FOR TILLING GROUND.
No. 385,984. Patented July 10, 1888.
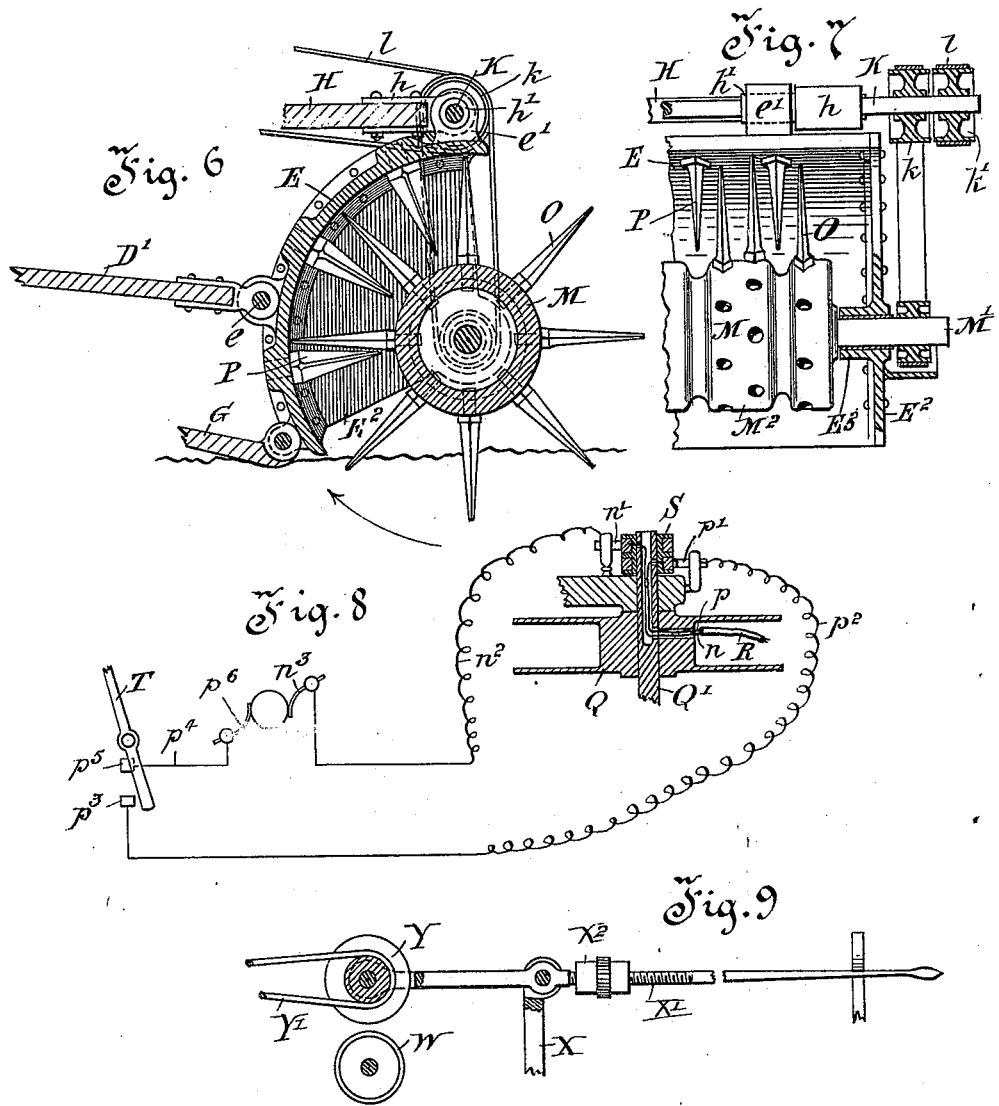
Witnesses.
Inventor,
Edwin Ruthven Whitney
By his Attorney

UNITED STATES PATENT OFFICE.

EDWIN RUTHVEN WHITNEY, OF ST. JOHNSBURY, VERMONT, ASSIGNOR TO THE STANDARD ELECTRIC COMPANY OF VERMONT, OF SAME PLACE.

APPARATUS FOR TILLING GROUND.

SPECIFICATION forming part of Letters Patent No. 385,984, dated July 10, 1888.

Application filed December 16, 1887. Serial No. 258,129. (No model.)

*To all whom it may concern:*

Be it known that I, EDWIN RUTHVEN WHITNEY, of St. Johnsbury, in the county of Caledonia and State of Vermont, have invented certain new and useful Improvements in Apparatus for Tilling Ground; and I do hereby declare that the following is a full, clear, and exact description of the same.

This invention relates to the class of agricultural machines used for breaking up ground, and I propose to use electricity as the motive power for doing the work, the plan being to carry on a suitable conveyance to the land to be worked an electric dynamo-machine and a hydrocarbon-engine for running it, and to station these usually centrally at one end of the lot, and from this stationary source obtain the power to operate the tilling mechanism of a machine to be moved back and forth on the field in the same manner as an ordinary gang-plow, but at a much more rapid pace.

For full comprehension, however, of the invention reference must be had to the annexed drawings, in which—

Figure 1:
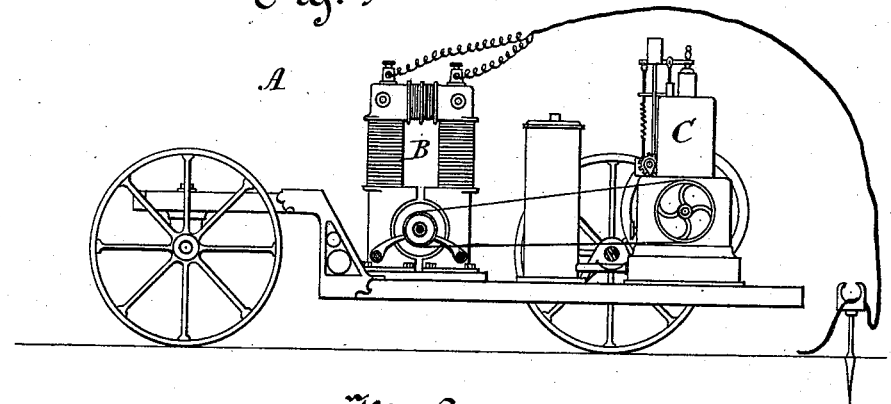
Figure 2:
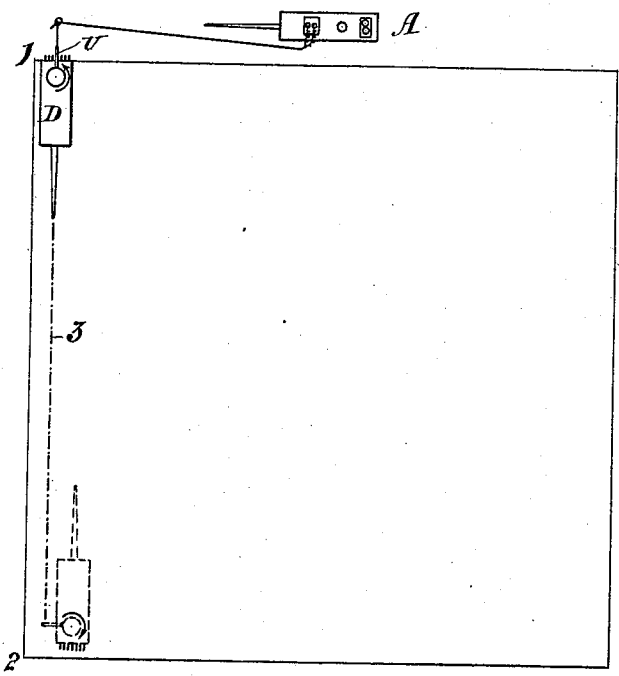
Figure 3:
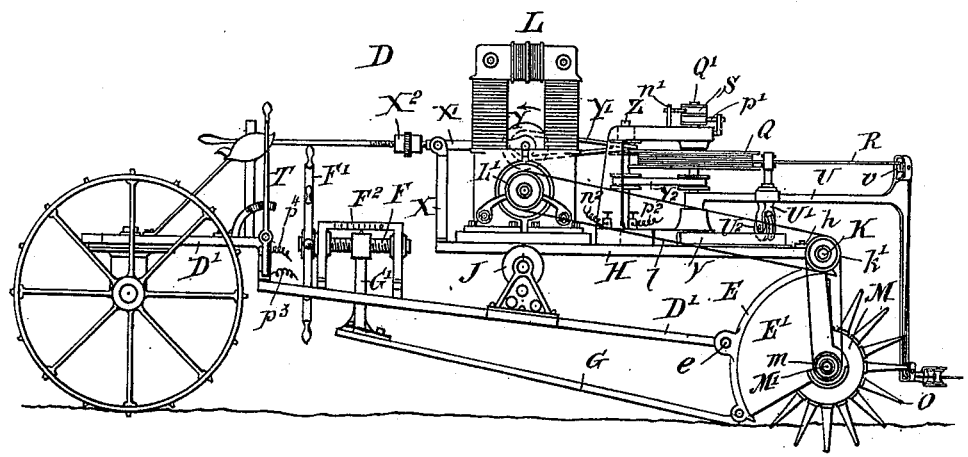
Figure 4:
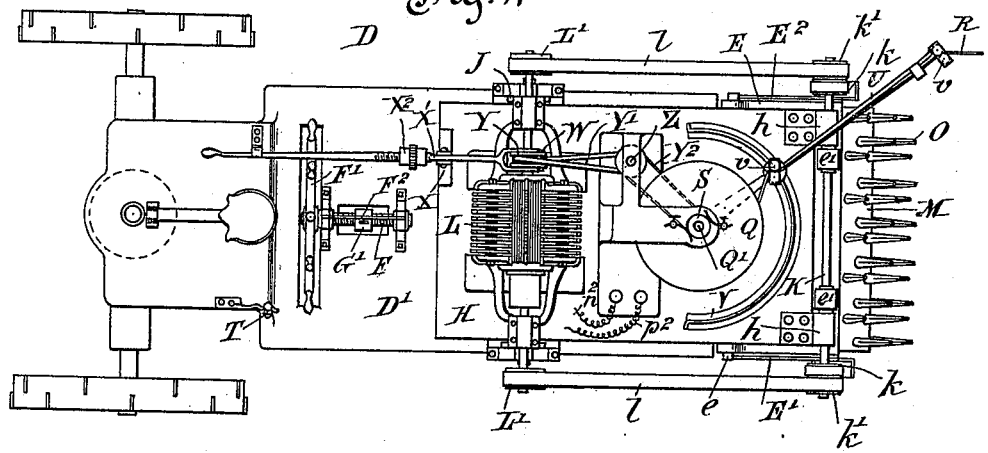
Figure 5:
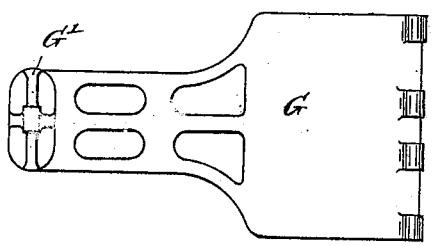

Figure 1 is a side view of the conveyance carrying dynamo, engine, &c.; Fig. 2, a diagram showing manner of working the lot; Fig. 3, a side view of tilling-machine; Fig. 4, a plan of same; Fig. 5, a detail of drag-plate of same. Fig. 6 is a detail vertical transverse sectional view of cutting-drum or tilling mechanism proper and segment of cylinder carrying it and forming part of such mechanism; Fig. 7, a part rear view of same, showing bearings for cutting-drum in section. Fig. 8 is a vertical sectional detail of electric-cable carriage mounted on tilling-machine, and shows in diagram the electrical connections from cable terminals to motor-brushes and means for cutting the current on or off; and Fig. 9, a detail of device for enabling the motor to operate the cable-carriage to wind up the cable when the machine is returning toward source of power.

Similar letters of reference indicate like parts.

Referring to Fig. 1, A is a conveyance, of suitable construction, to carry an electric dynamo-machine, B, of requisite capacity, ten-horse power being preferable, although a little more than sufficient, and a hydrocarbon-engine, C, preferably of the Richards type, which is specially adapted for running the dynamo. This conveyance can easily be drawn to the desired spot—say in a central position at one end of a field, as shown in Fig. 2—by a single team and be under the charge of one person.

D in Figs. 3 and 4 represents the tilling-machine, which can be drawn to the field by a single team, and then the team attached to the dynamo conveyance be unhitched and added, so that the apparatus will be drawn very rapidly over the ground while the machine is working, the only drag on the horses being the weight of the machine itself, as the work is performed entirely by the motor carried on it. The machine D will now be described in detail.

D' is the main frame, of desired length and breadth, secured at its forward end to and supported by an axle with pair of wheels of usual construction, with draft-pole placed as usual. This frame D' extends rearward and has hinged or pivoted to its end a segment, E, of a cylinder (with convex side facing front of machine) extending horizontally the full width across the end of the frame and having end pieces, E' E², with journals E³ E³ (to receive the spindle ends of the tilling-drum, to be hereinafter described) formed in them, bolted or riveted to flanges on its ends. The driver's seat is situated near the forward end of the machine, and behind this seat on the main frame D' are mounted two standards, in which is journaled a screw-shaft, F, provided with a hand-wheel, F', of suitable size.

G is a drag-plate, usually cast in the shape shown in Fig. 5, tapering toward its forward end and being the full width of segment E at its rear, with eyes cast on that end, so that it may be pivoted to such segment near its lower end, on which similar eyes are cast for the purpose. A hanger, G', is bolted at its bottom end to the forward end of drag-plate G and has a head formed on its top end, which is screw-threaded to work on the screw-shaft F, the main frame D' being slotted to allow the hanger G' to pass through, as shown. The length of this hanger G' is such that the drag-plate G is supported at an angle, as shown in Fig. 3, the rear end bearing on the ground and sliding over it, and by means of the handwheel F' and screw-shaft F can be moved forward or backward. By drawing the lower edge of the segment E forward the tilling-drum will be lowered to work, and by pushing it back it will be raised clear of the ground, as will be readily understood when it is borne in mind that the pivoting-point e is the fulcrum-point of the segment E, which in this respect acts as a lever.

H is a table or carrier made of any suitable material and about half the length of the main frame. Its forward end is supported on a flanged roller, J, carried in bearings mounted on the top of main frame D', and the rear end is furnished with bearings h h for a transverse pulley-shaft, K, carrying the pulleys k k and k' k' at each side of the machine. The bearings h h have turned portions h' h', over which eyes e' e', cast near the upper edge of segment E, fit, and so pivot it to the table H. On this table H is mounted the electro-magnetic motor L and the mechanism for the cable, which will be hereinafter described.

Each of the spindle ends of the tilling-drum, to be described farther on, carries a pulley, m, connected with the pulley k on shaft K by belt, and the pulleys k' k' on the same shaft are connected by bands l l with pulleys L' L' on the motor-shaft, which is made the necessary length.

The reason for pivoting the segment E to the table H in the manner shown is that the distance between pulleys k k and m m may never vary, and it will be seen that as the lower edge of such segment is moved backward or forward the table pivoted to its upper edge must be moved forward or backward in the reverse direction, the flanged roller J allowing this to be done easily.

Referring to Figs. 6 and 7, which show clearly the construction of the tilling-drum and the segment, E, carrying it, M is the tilling-drum, of desired diameter and thickness of metal, with a spindle, M', projecting from each end and bearing in the journals E³ E³, formed in the end pieces, E' E', of segment E, and with its periphery preferably ridged in longitudinal section, as shown at M², so as to form sufficient bed for holding the spikes O, which may be screwed into same, as shown, or otherwise secured in place.

On the inside or concavity of segment E are arranged three rows of teeth, P, running its entire length and corresponding in number and position. These teeth P are of somewhat greater proportion than the spikes O, but are similar in shape and screwed in like manner into threaded openings in longitudinal ribs on the segment.

The spikes O on the drum M are so arranged in rings around the periphery that there shall be two rings acting in conjunction with each vertical series formed of three of the teeth P, so that as the drum rotates the earth dug up by the spikes O will be very finely pulverized between the sets of teeth and spikes. The drum will rotate in the direction indicated by the arrow in Fig. 6, and the bottom edge of the segment E, as shown, presents an effective cutting-edge.

The cable carrying, guiding, and winding mechanism is shown in Figs. 3, 4, 8, and 9, and may be described as follows: A reel, Q, preferably of wood or other insulating material, is mounted on a vertical shaft, Q', journaled in any suitable frame, also of insulating material or insulated, and is of capacity sufficient to carry an insulated electric cable, R, of about a quarter of a mile in length. This cable carries the two conducting-wires $p\ n$, which lead from the dynamo and terminate in segments of a small commutator, S, mounted on the end of reel-shaft Q', which is suitably hollowed for the passage of the conducting-wires. By suitable brushes, $p'\ n'$, the insulated conducting-wires $p^2\ n^2$, (carried in the framing,) respectively connected with one brush, $n^3$, of the motor-commutator and with a contact-piece, $p^3$, on the side of main frame D', are connected with commutator S, while a third conducting-wire, $p^4$, connects the other brush, $p^6$, of the motor-commutator with another contact-piece, $p^5$. These contact-pieces $p^3\ p^5$ are situated near the driver's seat, suitably insulated from each other, and form a break in the electric circuit, a suitable key in the shape of a lever, T, with spring-lock, Figs. 3 and 8, being arranged conveniently for the driver to close or open the circuit at this point, and thus control the current.

The device for guiding the cable to the reel consists of a right-angled arm, U, mounted loosely on reel-shaft Q', projecting outward sufficiently to clear the tilling-drum, belts, &c., and downward to within about eighteen inches from the ground. This arm is supported by means of a downwardly-projecting lug, U', carrying a runner, U², which travels on a curved track, V, on the table, the center of which is the reel-spindle Q'. Suitable guard-pulleys, v, are arranged at the necessary points on the arm to guide the cable easily and with as little friction as possible when unwinding or being wound.

In order to wind up the cable on returning to the starting-point, I mount a friction-pulley, W, on the motor shaft, as shown in Figs. 4 and 9, and in a standard, X, mounted on the forward end of the table H, pivot a lever, X', one end of which carries a grooved frictional pulley, Y, and the other extends forward within reach of the driver. A twist cord or band, Y', connects this pulley Y with a pulley mounted on a vertical shaft, Z, with bearings in the framing carrying reel-shaft Q', and additional pulleys on these two shafts are connected by another band, Y². The frictional pulley Y is normally held out of contact with the pulley W on the motor-shaft by depressing the forward end of the lever, X', carrying it, and allowing any suitable spring-rack to hold it; and when it is desired to wind up the cable the lever is released and the weight of the frictional pulley (having been adjusted by means of movable weight X² on the lever) will cause it to come in contact with the pulley on motor-shaft, and, together with reel Q, be driven rapidly thereby only when the cable is slack; but the moment the slack is taken up and the cable tightens up at all the strain is sufficient to cause slipping between the friction-pulleys, so that there is no danger of the cable being wound too fast.

The plan of working is shown in diagram in Fig. 2, the square representing the lot to be worked. After stationing the dynamo conveyance centrally at one end, the horses are unhitched from it and added to the team drawing the tilling-machine D, which then starts for the corner 1, the cable unwinding as it proceeds, its terminals having been first attached to the binding-posts of the dynamo. When this corner is reached, a suitable stake to hold the cable at that point is driven into the ground, the machine is turned in the direction shown—i. e., at right angles to the top of the field—and the arm U arranged to lay the cable in a line with the center of the machine. The handwheel F' is now turned to draw forward the drag-plate G to lower the drum M to work any desired depth in the ground, as may be shown by the indicator F², arranged above the screw-shaft F, and when starting from this point the driver lets on the current by means of lever T and the tilling-drum is rotated at a rapid rate until corner 2 is reached, when the current is cut off and the drum M raised by pushing back the drag-plate G, and the machine then reversed, as shown, the arm U swinging around to a position in which it can take up the cable which has been laid, as shown by dotted line 3. Upon starting the return journey, the driver, in addition to lowering the drum and letting on the current, releases lever X', and the cable is therefore wound up, as described, until the top or starting end of the field is reached, when the stake holding the cable is withdrawn and readjusted, and the journey repeated.

It will be understood that all mechanism to be handled by the person or persons in charge of the machine will be carefully insulated from the current.

What I claim is as follows:

1. In an electrical apparatus for tilling ground, and in combination, a dynamo-electric machine and an engine for running same, both mounted on a movable platform stationary during the operation, a movable carriage, an electro-magnetic motor mounted on same, tilling mechanism operated from shaft of electric motor, an electrical conductor conveying current from stationary dynamo-machine to moving electric motor, unwound when moving away from source of current and wound up when returning toward same, and a key or lever for closing or opening break in electrical circuit, all as set forth.

2. In an electrical apparatus for tilling ground, and in combination, a dynamo electric machine and a hydrocarbon-engine for running same, both mounted on a movable platform stationary during the operation, a movable carriage drawn by any power, a rotary tilling-drum connected with same, an electro-magnetic motor mounted on such carriage and operating such tilling-drum, an electrical conductor from said stationary dynamo to said moving electric motor, a hold-fast for regulating line of travel of such conductor, and a reel mounted on said carriage on which such electrical conductor is wound, as set forth.

3. In an electrical apparatus for tilling ground, and in combination, a carriage drawn by any power, a rotary tilling drum connected with such carriage, an electro-magnetic motor mounted on said carriage and operating the tilling-drum, an electrical conductor conveying an electric current from any suitable source to the motor, a reel capable of rotation mounted on said carriage, a lever and a frictional disk carried by it, and a friction-pulley on the motor-shaft, by which such frictional disk is operated to rotate the reel, so as to wind up upon it the conductor as the carriage is drawn toward the point from which it started, as set forth.

4. In an electrical apparatus for tilling ground, the combination, with the carriage drawn by any suitable power and an electro-magnetic motor connected with electric source and a table or carrier on which same is mounted, of a segment of a cylinder provided with spikes on its concave face, pivoted to main frame, and connected pivotally to end of said table or carrier, and a spiked rotary drum carried from ends of said segment and receiving motion from said electric motor, as set forth.

5. In an electrical tilling apparatus, the combination, with the main frame of the carriage drawn by any suitable power, of a segment of a cylinder pivoted thereto on its convex side at a point between its longitudinal edges, pivotally connected also at its upper edge with table or carrier on which electric motor is mounted, and carrying the rotary tilling-drum, a drag-plate pivoted to lower edge of such segment, and means under control of driver for moving said drag-plate forward or backward, so as to oscillate the segment, and thereby vary the vertical position of the tilling-drum, all as set forth.

6. In an electrical tilling-machine, and in combination, the main frame, the carriage supporting forward end of same, and the segment of cylinder pivoted to and supporting rear end of same, a flanged roller mounted on such main frame, and the table or carrier for the electric motor, carried at its forward end on said flanged roller and pivoted at its rear end to and supported by said segment, as shown and described.

EDWIN RUTHVEN WHITNEY.

Witnesses:
A. L. FARWELL,
P. F. HAZEN.